(12) United States Patent
Punti

(10) Patent No.: US 10,810,175 B2
(45) Date of Patent: Oct. 20, 2020

(54) STORING SEGMENTED DATA

(71) Applicant: KING.COM LIMITED, St. Julians (MT)

(72) Inventor: Galderic Punti, Barcelona (ES)

(73) Assignee: KING.COM LTD., St. Julians (MT)

( * ) Notice: Subject to any disclaimer, the term of this patent is extended or adjusted under 35 U.S.C. 154(b) by 400 days.

(21) Appl. No.: 15/086,663

(22) Filed: Mar. 31, 2016

(65) Prior Publication Data

US 2017/0286464 A1 Oct. 5, 2017

(51) Int. Cl.
*G06F 16/00* (2019.01)
*G06F 16/22* (2019.01)
*G06F 16/951* (2019.01)
*A63F 13/355* (2014.01)

(52) U.S. Cl.
CPC ........ *G06F 16/2237* (2019.01); *A63F 13/355* (2014.09); *G06F 16/951* (2019.01)

(58) Field of Classification Search
CPC .. G06F 16/2237; G06F 16/951; G06F 16/248; A63F 13/355; A63F 13/40; A63F 13/42
USPC ......................................................... 707/745
See application file for complete search history.

(56) References Cited

U.S. PATENT DOCUMENTS

| | | | | |
|---|---|---|---|---|
| 5,008,853 A | * | 4/1991 | Bly ..................... | G06F 16/1774 715/751 |
| 6,257,980 B1 | * | 7/2001 | Santini, Jr. ............ | A63F 3/0645 273/269 |
| 7,653,605 B1 | * | 1/2010 | Jackson ............... | G06N 99/005 706/20 |
| 7,806,759 B2 | * | 10/2010 | McHale .................. | A63F 13/10 463/7 |
| 9,218,379 B2 | * | 12/2015 | Grondin ............ | G06F 17/30486 |
| 2001/0009867 A1 | * | 7/2001 | Sakaguchi .............. | A63F 13/12 463/42 |

(Continued)

OTHER PUBLICATIONS

Mei Ying et al., "A Survey on Bitmap Index Technologies for Large-Scale Data Retrieval;" 2013 6th Intl. Conf. Intelligent Networks and Intelligent Systems, IEEE, pp. 316-319 (Nov. 1, 2013) retrieved on Mar. 3, 2014 XP032622791.

(Continued)

*Primary Examiner* — Vincent F Boccio
(74) *Attorney, Agent, or Firm* — Saul Ewing Arnstein & Lehr LLP

(57) ABSTRACT

A device, system, and computer implemented method for storing segmented data in a computer memory, the segmented data indicating which of a plurality of entities belong to which of a plurality of segments, each segment accommodating entities sharing a single binary characteristic. A computer receives a list of entity identifiers selected from a sequence of entity identifiers, each entity identifier in the list representing an entity which belongs to a segment; the computer uses the list to create a bitmap in which each bit has a bit position in a bit sequence corresponding to the sequence of entity identifiers. The state of each bit indicates whether the entity identifier representing that position in the sequence identifies an entity belonging in the segment or not; and the bitmap is stored in a memory in association with a segment identifier, as the segmented data.

29 Claims, 10 Drawing Sheets

(56) References Cited

U.S. PATENT DOCUMENTS

| | | | |
|---|---|---|---|
| 2002/0082087 A1* | 6/2002 | Kuroda | A63F 13/12 463/42 |
| 2007/0173325 A1* | 7/2007 | Shaw | A63F 13/12 463/42 |
| 2009/0270174 A1* | 10/2009 | Kelly | G07F 17/3267 463/42 |
| 2009/0305759 A1* | 12/2009 | Nishimura | A63F 13/00 463/9 |
| 2012/0303633 A1 | 11/2012 | He et al. | |
| 2013/0005476 A1* | 1/2013 | Keswani | A63F 13/10 463/42 |
| 2013/0137508 A1* | 5/2013 | Kelly | G07F 17/3258 463/27 |
| 2013/0268562 A1* | 10/2013 | Faitelson | G06F 21/6218 707/783 |
| 2013/0346170 A1* | 12/2013 | Epstein | G06Q 30/02 705/14.14 |
| 2014/0279853 A1* | 9/2014 | Grondin | G06F 17/30486 707/609 |
| 2016/0085832 A1 | 3/2016 | Lam | |
| 2016/0279511 A1* | 9/2016 | Miller | A63F 13/26 |
| 2017/0060912 A1* | 3/2017 | Liu | G06F 16/215 |
| 2017/0124801 A1* | 5/2017 | Arnone | G07F 17/3223 |

OTHER PUBLICATIONS

International Search Report, dated Jun. 13, 2017, issued in corresponding International Application No. PCT/EP2017/057782.

* cited by examiner

Bitero

Segments for Core User ID: 1325616467

13256164667

< Back to segments

| ID | Name | Contact Email | Memory Usage (Bytes) | Expiry Date | Players Count | |
|----|------|---------------|----------------------|-------------|---------------|---|
| 1662 | _abgroup1_t_fix.csv | cosima churchill | 45717402 | 25 Jan 2016 | 234451209 | ⬇ Export |
| 923 | country-ip.eg | galderic punti | 241155790 | 01 Jan 2022 | 119802593 | ⬇ Export |
| 621 | country-sim.eg | galderic punti | 207903852 | 01 Jan 2022 | 102203302 | ⬇ Export |

STORING SEGMENTED DATA

BACKGROUND OF THE INVENTION

This disclosure relates to storing segmented data.

There are many scenarios where large numbers of users of computer devices in a computer network are using an app supplied by an app provider. In this context, an app is an executable program which can be preloaded on a computer device or downloaded from a server. One example of such an app is a game, which can be played by a user on their local computer device (such as their smartphone, iPad or tablet). Such apps require regular contact with a central server or servers for the continued engagement of the user with the app. These are referred to as the "backend". A game may be played offline (without a connection to the backend), but generally an online connection is at least periodically required to service the game. For example, different versions of the game may be available for the game.

In order to access an app, a user of a computer device might log into the app using a user identifier and a password unique to the user. If he is on line, this information is passed to the backend. It is useful for the backend to know certain things about a user as soon as the user logs into the game at this local device. For example, it may be useful to know the territory from which a user has connected or the time period within which they have connected, or if they have been allocated a particular feature for testing. These are just examples of user data that are useful for the backend; there are many other pieces of user data which may be provided.

This user data is utilised by the app provider backend during run time to make fast decisions on what experience the user should be offered. When a user connects, decisions need to be made, for example, about the territory from which he had connected, how long he has been away from the game, whether he is testing a particular feature, what language he uses, etc. When a user connects there is an inadequate time to iterate over many previous weeks of data records to identify one particular user and ascertain these kind of details about him.

At present, user data is held in a database structure in which each row is identified by a row ID, and contains multiple pieces of data about each user. A user may be allocated to a row. In an attempt to speed up data access, it is possible to provide a large number of database nodes, each one storing information for particular subset of users in what is termed "user sharding". However, many databases are not suitable for answering the kind of queries set out above in a very short timeframe, e.g. as close to real-time as possible.

SUMMARY OF THE INVENTION

The present inventors have addressed the need to have user data materialised in a way that can be easily queried hundreds of thousands of time per second. They have devised a different approach on how to handle user segmentation, which gives significant advantages over a database such as an RDBMS or NOSQL database. User segmentation is the requirement of dividing users into groups (segments) based on particular binary statuses of the users. For example, did a user connect from USA? Did the user connect last week? A segment identifier can indicate the binary query (e.g. as a query name) which is answered for each user in the segment.

An aspect of the present invention provides a computer implemented method of storing segmented data in a computer memory, the segmented data indicating which of a plurality of entities belong to which of a plurality of segments, each segment accommodating entities sharing a single binary characteristic, the method comprising: receiving at a computer a list of entity identifiers selected from a sequence of entity identifiers, each entity identifier in the list representing an entity which belongs to a segment; the computer using the list to create a bitmap in which each bit has a bit position in a bit sequence corresponding to the sequence of entity identifiers, wherein the state of each bit indicates whether the entity identifier representing that position in the sequence identifies an entity belonging in the segment or not; and storing the bitmap in a memory in association with a segment identifier, as the segmented data.

The sequence of entity identifiers can be a numerical sequence.

In some embodiments, the sequence is divided into ranges, and the entity identifiers are divided into groups, wherein each group of entity identifiers belongs in a range of the sequence, and wherein multiple bit maps, each associated with a respective range, are stored with the segment identifier.

The entities can be users of computer devices connectable in a communication network, or computer devices connectable in a communication network. For example, some users may be associated with more than one computer device, or with a single computer device.

In some embodiments, the computer devices are connectable to a server in the communication network for downloading a digital product from the server.

In some embodiments, multiple lists of entity identifiers are received, each list associated with a respective segment and multiple bit maps are created, each being stored in association with a respective segment identifier wherein the same position in the bit sequence of each bitmap represents the same entity identifier.

The binary characteristic of a segment can be one of:
whether an entity has connected from a particular territory;
whether an entity has connected within a predetermined time period;
whether an entity is testing a new feature;
whether the entity is of a specific gender;
whether the entity requires a digital product in a specific language.

The bitmap associated with each segment identifier can be stored in the computer memory in compressed or uncompressed form.

The list of entity identifiers may be received at the computer with a segment name indicating the binary characteristic of the segment.

In some embodiments, the method comprises storing in the computer memory a mapping of segment names and segment identifiers.

In some embodiments, the method comprises after receiving the list of entity identifiers, determining if information to identify an existing segment is provided, and if so, updating an existing bitmap for the segment in order to create the bitmap using the list.

If information to identify the segment is not received, a segment name may be created from metadata received with the list and associated with a segment identifier in the mapping.

When a bit is set to a positive state at a position in the bitmap it indicates that the entity associated with the corresponding position in the sequence belongs in the segment. Conversely when a bit is set to a negative state at a position in the bitmap, this indicates that the entity associated with the corresponding position in the sequence does not belong in the segment. These negative state bits also provide useful information about the segments. It will be understood that a positive state may be 1 and a negative state may be 0, but the reverse logic can also be implemented.

Another aspect provides a computer device comprising: a computer memory; and a computer, the computer being programmed by computer executable instructions to execute a method of storing segmented data in the computer memory, the segmented data indicating which of a plurality of entities belong to which of a plurality of segments, each segment accommodating entities sharing a single binary characteristic, the method comprising: receiving at the computer a list of entity identifiers selected from a sequence of entity identifiers, each entity identifier in the list representing an entity which belongs to a segment; the computer using the list to create a bitmap in which each bit has a bit position in a bit sequence corresponding to the sequence of entity identifiers, wherein the state of each bit indicates whether the entity identifier representing that position in the sequence identifies an entity belonging in the segment or not; and storing the bitmap in a memory in association with a segment identifier, as the segmented data.

In some embodiments, the computer is further programmed to implement a method of responding to a request transmitted from a requesting computer device to the computer device, the method comprising: receiving the request, the request comprising at least one of a user identifier and a segment identifier identifying one or more segments; accessing one or more bitmaps associated with the one or more segments, using the bitmap to determine the results of a first type of query (a) whether a user identified by the user identifier is in the one or more segments and/or the result of a second type of query (b) which users are in the one or more segments; and responding to the request with a response to the first and/or second type of query.

Another aspect provides a computer system comprising: a computer device according to the preceding paragraphs; at least one source for providing lists of entity identifiers of entities belonging to a segment; and at least one requesting computer device for issuing requests to the computer device.

The at least one source can comprise a computer device with a display operable to display a web-based user interface with which a user can interact to generate the list of entity identifiers.

The at least one source can comprise a database storing data relating to the entities, and a processor programmed to execute an automatic script for extracting data from the database and generating the list of entity identifiers.

The requesting device can comprise a computer device having a display operable to display a web-based user interface with which a user can engage to generate requests and receive responses.

The requesting device can comprise a processor programmed to automatically generate requests and receive responses.

Another aspect provides a computer implemented method of responding to a request transmitted from a requesting computer device to a responding computer device, the method comprising: receiving the request, the request comprising at least one of a user identifier and a segment identifier identifying one or more segments each segment accommodating users sharing a single binary characteristic; accessing one or more bitmaps associated with the one or more segments, wherein in each bitmap a user belonging to a segment has a bit set in the bitmap of the segment; using the bitmap to determine the results of a first type of query (a) whether a user identified by the user identifier is in the one or more segments and/or the result of a second type of query (b) which users are in the one or more segments; and responding to the request with a response to the first and/or second type of query.

Each segment may be associated with a segment name identifying the binary characteristic of the segment.

The segment name may be included in the request transmitted from the requesting computer device.

The requesting computer device can be a server operable to provide digital products to the entities, wherein the server uses the response to determine which entities are to receive a particular digital product.

The digital product can be computer code, e.g. a particular version of a game or level of a game.

The digital product can be a digital item, such as an in-frame item such as a gift or booster.

A bitmap (or bitset) is a data structure which can answer the "binary-answer" type of question as exemplified in the preamble and above.

In a segment, a bit is allocated for each possible user ID. It is set to a predetermined status whenever the user is part of the segment, and to an opposite status when he is not. For example, it is set to 1 whenever the user is the part of the segment, and to 0 when he is not. In the present application, we refer to users as the entities which are identified by the entity identifier. However, it will be readily appreciated that an entity could be a computer device instead of the user of that device. It will further be appreciated that they may not be a one-to-one mapping between users and computer devices. For example, a user may use more than one device to access the app. In this case, a user may be identified by his log in, for example.

Bitmaps can readily be compressed, which significantly reduces the storage requirement. For example, for a billion user IDs, a bitmap associated with a segment could be stored in a compressed format in a storage requirement of 120 MB.

Embodiments of the invention described in the following provide some remarkable advantages, particularly as compared with accessing data from a database structure.

The following description is given for user data in the context of games, but it will be appreciated that the techniques are applicable for storing and creating segmented data in many other scenarios.

BRIEF DESCRIPTION OF THE DRAWINGS

For a better understanding of the invention and to show how the same may be carried into effect, reference is now being made by way of example, to the accompanying drawings in which:

FIG. 5 shows a web user interface illustrating the results of a search for segments of which a particular user forms a part;

FIG. 6 is a web user interface showing a list of all available segments;

DETAILED DESCRIPTION OF THE INVENTION

Figure 1:
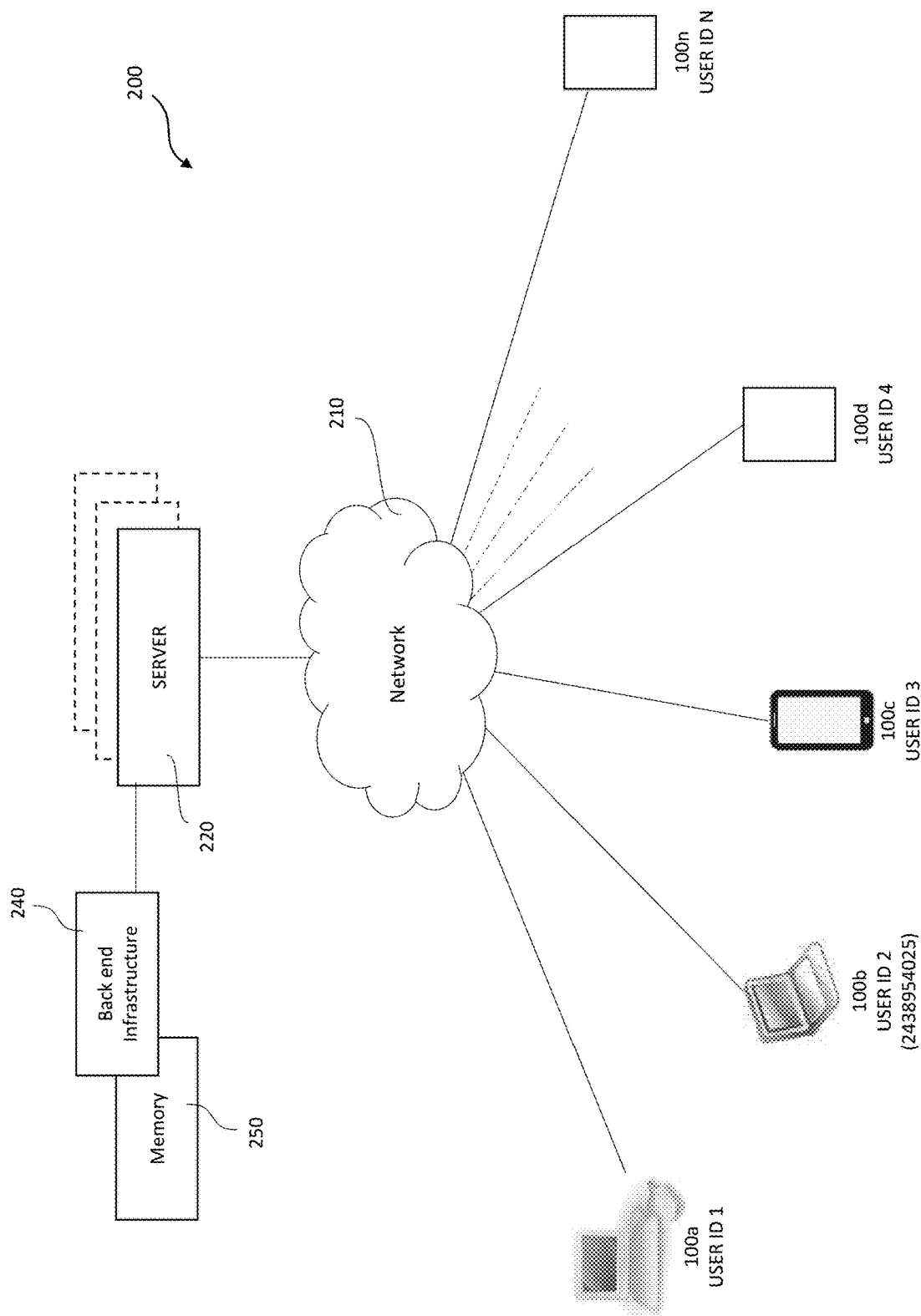
FIG. 1 is a schematic diagram of a computer network.

FIG. 1 schematically shows a networked computer system 200. The system 200 comprises an application server (or servers) 220 which delivers applications, for example games, to user devices 100*a*, 100*b* . . . 100N over a network 210. Some example user devices are shown in FIG. 1, including a PC, tablet and smartphone. Note that N could be an extremely large number, multiple billions in some scenarios. The application server comprises a backend infrastructure 240 which comprises one or more processors capable of executing code to implement the collection and compression of bitmaps described herein. The user data represented herein defines groups or segments in which users belong. The backend infrastructure includes a memory 250 which holds segmented user data to support the backend infrastructure 240. The memory 250 is associated with a bitmap engine 252 (FIG. 7) which is connected to the memory and can store and access segmented user data in the memory. The bit map engine comprises a processor or a computer executing a suitable computer program to implement the steps carried out in the following. The server 220 has a processor (not shown) which is responsive to requests from the user devices to play games and to deliver appropriate games (in the form of computer executable applications) to a user.

The server 220 may communicate via for instance, the Internet 210 to the one or more client or user devices, 100*a*, 100*b* . . . 100N. For example, the server provides for download or for online play of games such as the game of applicant "Candy Crush™".

This particular application has tens of millions (or even billions) of users worldwide, and a provider of such a game may wish to trial out or test new versions of the application, or test which features are popular and which are not so popular before including these in a new release for example. Alternatively, or additionally, the game provider may wish to target particular offers at particular user segments. Such offers may include promotional events such as offering free game items such as lives, boosters, new levels and so on. These typically depend on user data such as their country of log in, gender, if they have logged on in the previous week, etc.

When a user logs-on to access the service, the service provider ascertains what segment or segments the user belongs to. This requires a query to be run over potentially vast amounts of data before the proper offering can be returned to the user.

When using a database structure, this can be exceedingly time consuming, and in particular for applications such as "Candy Crush™" entail the service provider running queries over vast amounts of data stored in one or more database to find the segment(s) to which a user belongs. Typically, such queries strain computing resources and require increased storage space and processing power.

To avoid this, the present technique stores the user data in the form of a bitmap for each user segment. Users are each allocated a user identifier USER ID1, USER ID2 . . . USER IDN which represent a position in a sequence. This is most easily implemented by using a numerical sequence, but other forms of identifier could be used provided that they map to an ordered sequence.

Figure 2:
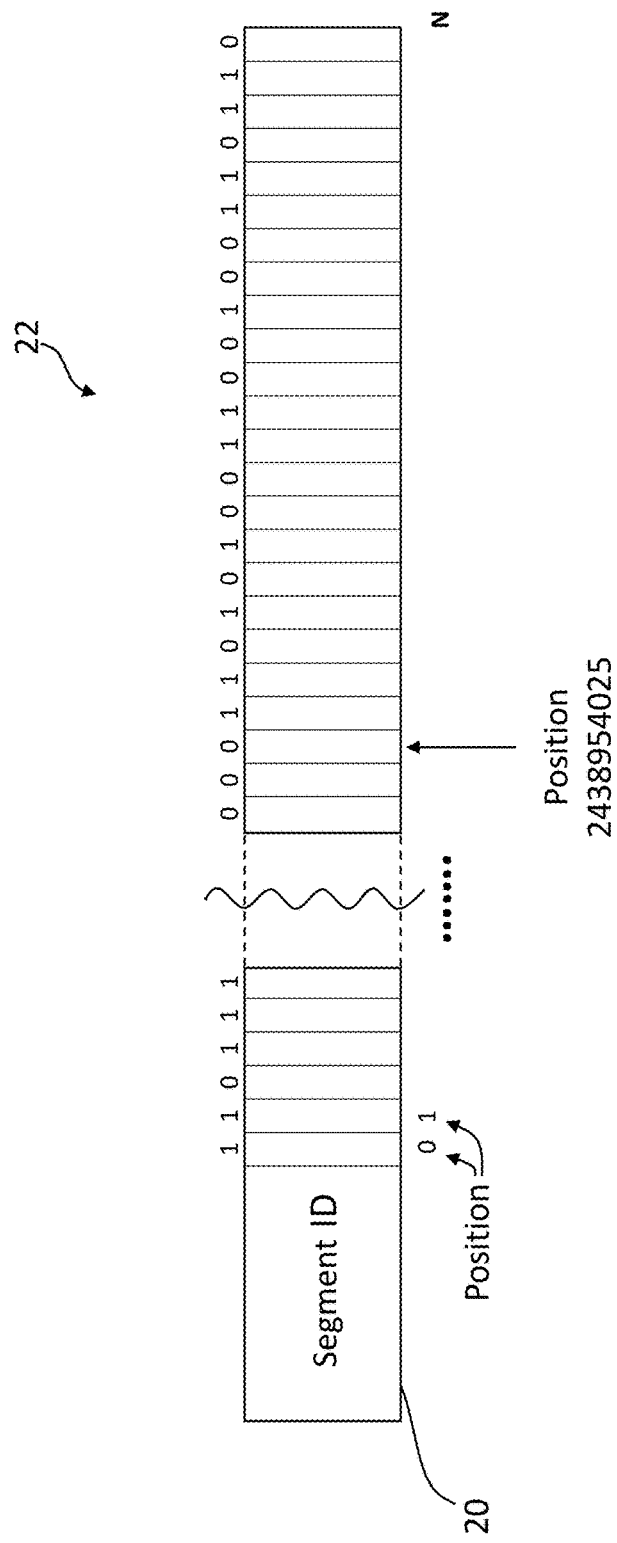
FIG. 2 is a schematic diagram showing an uncompressed bitmap associated with a segment identifier.
Figure 3:
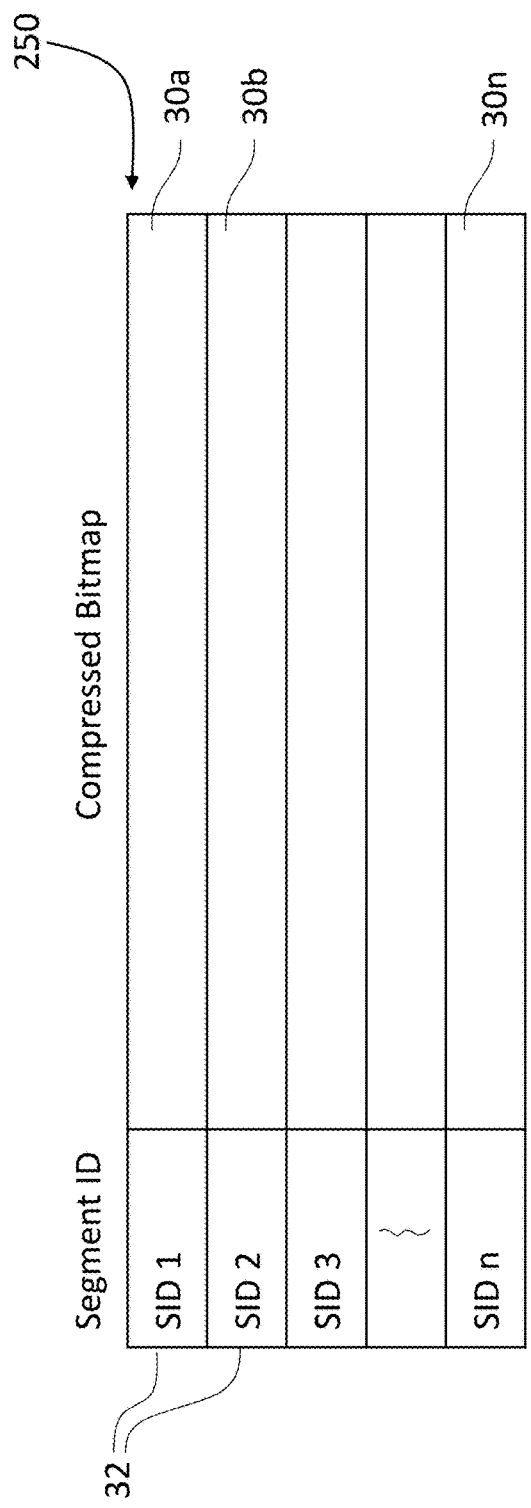
FIG. 3 is a schematic block diagram of a memory storing compressed bitmaps.

FIG. 2 illustrates a segment identifier 20 in association with a bitmap 22, stored in memory 250. In FIG. 2, the bitmap is shown uncompressed to illustrate the technique utilised herein to identify users in particular segments. In practice, and as shown in FIG. 3, the computer memory 250 will hold a number of different bitmaps 30*a*, 30*b* . . . 30*n* each in a compressed form associated with respective segment identifiers 32, Sid1, Sid2, etc. Note that n will be much smaller than N. The segment identifier is associated with a name of the segment (or is associated in a one-to-one mapping with a name of the segment) and represents a binary query. For example, a segment name may be "connected from the USA?" or "connected within last week?" There are numerous examples of segment identifiers, each one representing a binary query. That is, all queries relate to a situation where a user is either in the segment or not in the segment.

Each bitmap has a number of bit positions which run in a sequence from bit position 0 to bit position N, the maximum user identifier possible). As mentioned, N may be an extremely large number. Alternatively, users may be grouped into separate bounded sequences, whereby each segment may have multiple bounded sequences, each sequence having a limited range of numbers. The bounded sequences in a segment can begin at any number, as long as within each bounded sequence the users are numbered sequentially from there onwards. Each bounded sequence can contain any number of users; there could be relatively small numbers or very large numbers. Sequences do not have to be the same length.

Figure 3A:
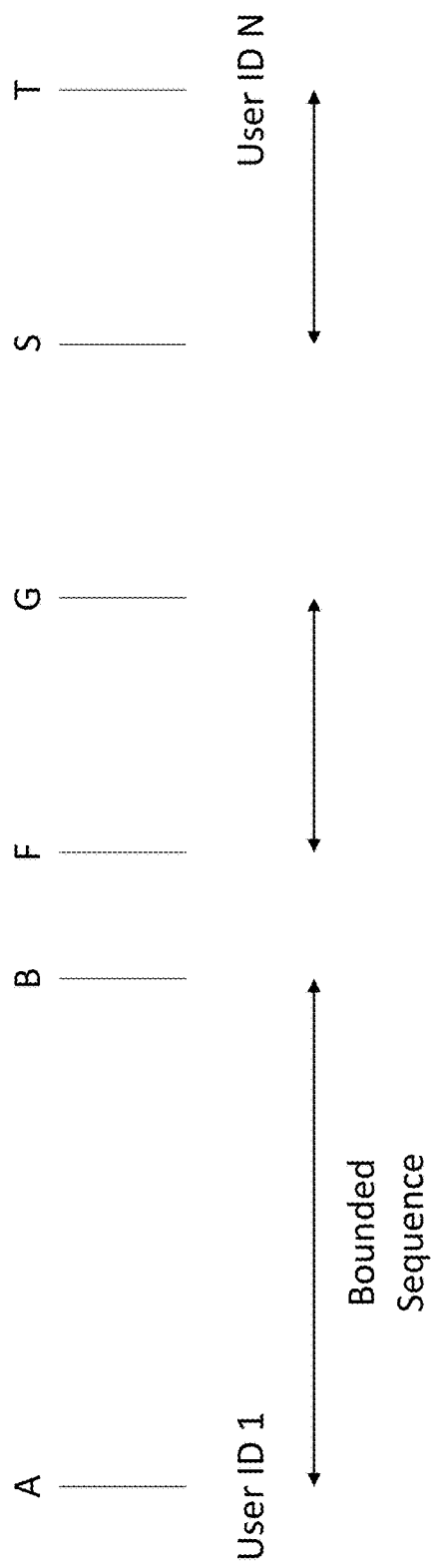
FIG. 3A shows the idea of bounded sequences across a user group from ID1 to IDN.

FIG. 3A shows the idea of bounded sequences across a user group from ID1 to IDN. A,B,F,G,S and T are used to represent numbers, wherein users are numbered sequentially between A and B, between F and G and between S and T. However, F does not have to sequentially follow B, nor S follow G. There may or may not be unnumbered users between ID1 and IDN. The bounded sequences do not have to cover the entire population of users.

By way of example, FIG. 2 shows bit position 2438954025. The status (0) of the bit in this bit position indicates that the user having USER ID2 24038954025 is not in the segment (bit set to 0). If the status of that bit were set to 1 it would indicate that that user is in the segment. The user identifiers are in the same sequence as the bit positions in the bitmap. Therefore by locating the bit in the position indicated by the user identifier's position in the sequence of numerical user identifiers, the answer to that question about the user can be given. Note that the answers about whether a user is not in a segment (bit set to 0) can be as useful in some circumstances as answers about whether a user is in a segment (bit set to 1).

Alternatively, a bitmap may be utilised to indicate which users are in a segment, by iterating through the bits which have a value of 1. For example, in the example shown in FIG. 2, user 0, user 1, user 3, user 4, user 5 form part of a segment, whereas user 2 does not.

Different segments can very easily be combined with Boolean operators, because in each segment the same position represents the same entity (e.g. user).

As a CPU (central processing unit) can combine millions of bits in a few microseconds, where 10 segments are stored, (n=10), each representing one binary question, it is possible to simulate that there are $2^{1024}$ materialised segments ($2^{1024}$ are all possible Boolean algebra expressions with 10 variables). For example, the question whether a user (1) connected from the USA and (2) connected last week can be answered by combining the two relevant bits from the respective segments at the bit positions for that user ID.

A significant advantage of the bitmap approach described herein is that the membership of a user in a segment can be checked by locating the bit position which is the position in the sequence of the entity identifier as described above. However, the reverse access is also possible such that all users in a segment can be identified (by iterating through all the bits set to 1 in the bitmap for that segment).

When compared with an RDBMS or NOLS database, this is a significant advantage. In an RDBMS or NOLS database it is necessary to store the information by segment ID or by user ID. If both types of accesses are needed, a reverse index needs to be constructed, which means that in fact, the information has to be stored twice.

Another advantage is that different segments from different databases can be called and combined into one bitmap because the invention gives a combined index for the data to be segmented, rather than having to manage two different sets of indexes from two different stored databases. This compares with known methods which must generate a new database and then recreate the indexes to extract the relevant user IDs.

Being able to provide a snapshot of a segment is a useful feature. Creating a snapshot of the 600 million users' segments can be done in a couple of seconds. It is a simple case of copying a file, the file representing a compressed bitmap. By comparison, in order to achieve that in a database sharded by user, it would be necessary to query for all the users (to retrieve the original information) and then prepare around 600 million updates to create a snapshot. In one user case a segment indicates who should receive an in-frame item, having a snapshot protects a user from receiving incorrect game features when any related segment changes occur. In the case where segments are updated continuously, for example, it can be useful to maintain a record of what the segment looked like at a given point in time. For example, if a user receives regular in-game items before the segment they fall in gets updated, and the update implies the user is not still entitled to gifts even when they are, referring to a pre-update snapshot could be done to ensure the user continues to receive the gifts.

A further advantage is that more segmentation dimensions (segments) can be added without having to redeploy a single line of code. A new segment can simply be introduced (for example, through a web UI) and can then be combined with the others. The only requirement is that the numerical sequence representing entity identifiers remains constant in correspondence to the sequence of bits in the bitmaps for the segments.

Figure 4:
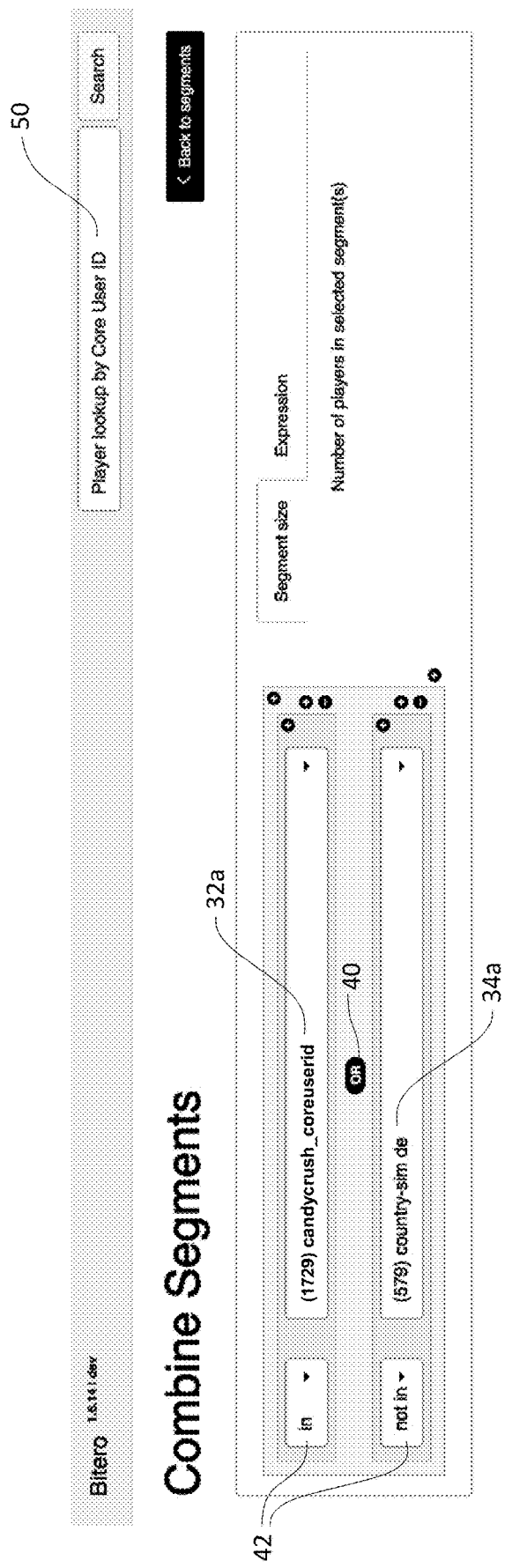
FIG. 4 shows a web user interface, allowing segments to be combined.

FIG. 4 illustrates an interface presented to a user by a computer device utilised by the app provider. For example, this computer device could be associated with the server 220 and the backend infrastructure. Alternatively, the computer device could be connected elsewhere in the network. The user interface allows segments to be combined. For example, FIG. 4 shows two segments which are to be combined using the Boolean operator OR. Each segment has an allocated number and name. Segment ID 32*a* is:
   (1729) candycrush_coreuserid,
and segment 32*b* is:
   (579) country-sim de Logical status fields 42 allow the user to define if the query is looking for "in~" or "not in" the segment. Segment ID 32*a* means a user who has downloaded the game "Candy Crush".

This particular user has downloaded Candy Crush, but is not in Germany.

FIG. 4 shows the Boolean OR operator 40 acting on the segments for this user. In this way the user may combine the users in segment 1729 with the users in segment 579 with the 'OR' operator (adding the segments). In the right tab the total amount of users in the resulting segment will appear.

Figure 9:
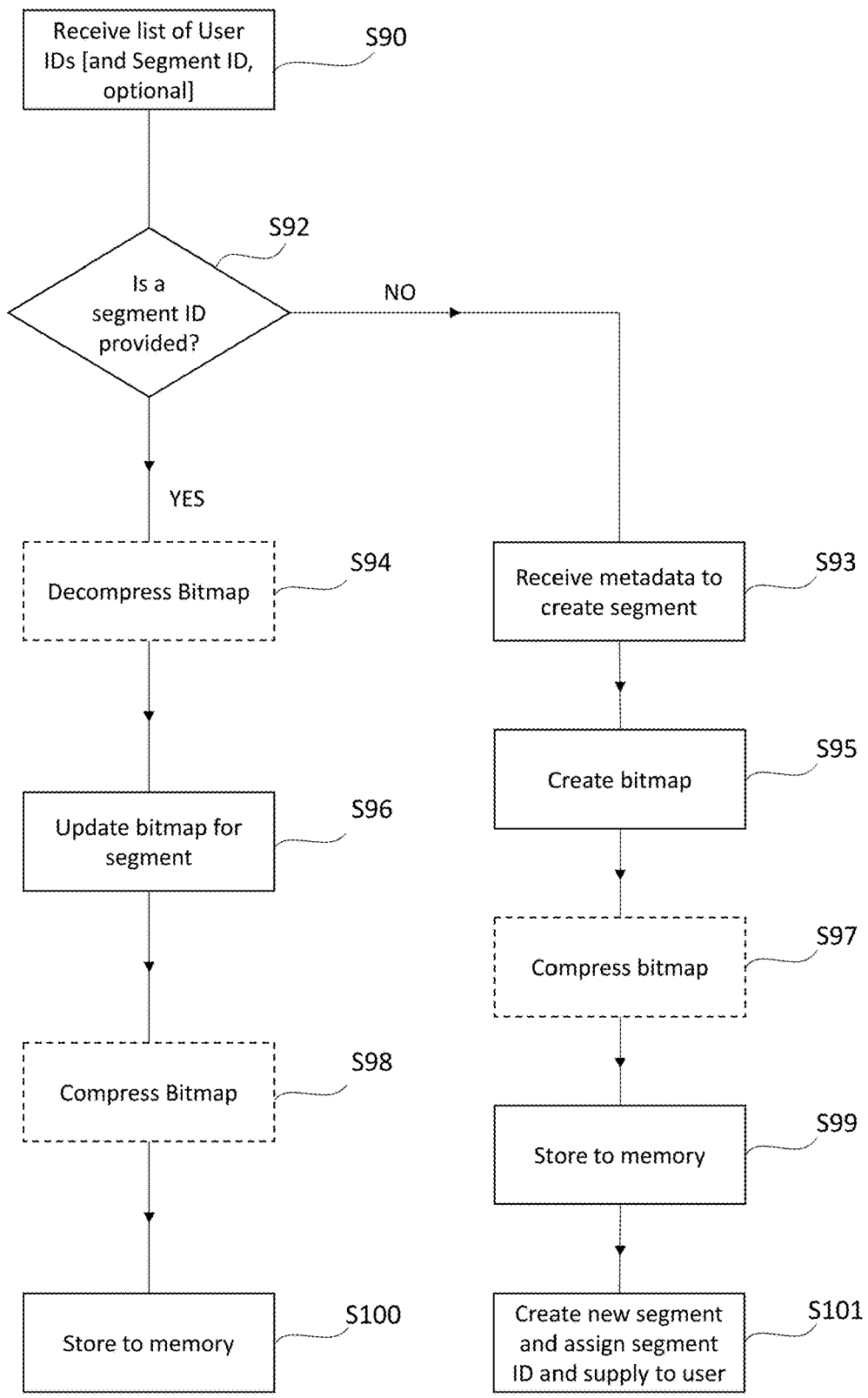
FIG. 9 is a flowchart illustrating creation of compressed bitmaps for storage with segment identifiers.

Reference is now made to FIG. 9 to describe how bitmaps are created per segment. When a segment is created for the first time, metadata is provided by the segment creator, including a human readable name, a description, the identity of the segment creator, the expiry time etc. The bitmap engine 252 allocates a numerical identifier SID to the new segment, and stores an association between the numerical identifier and the metadata.

Segments can be added in a different page presented as a web UI the user interface by entering a segment identifier and uploading a list of users in that segment. This can be in the form of a plain text file of user identifiers. The bitmap engine 253 receives the list (S90), determines (S92) if there is a segment already or not. If there is no segment ID provided (or segment name which maps to a segment ID), metadata received with the list is used to create a segment (S93). The engine a bitmap (S95) for the segment, compresses it if necessary (S97) and stores (S99) it in the memory 250 and also to separate storage medium such as a disk (not shown). This flow is shown in FIG. 9. The compressed bitmap is assigned to a new segment id (S101), and the segment id is returned to the user so he can start using it.

Optionally, the user may provide a segment id (or name) in step (S92), in which case a new segment is not created. Instead, the existing associated bitmap is optionally decompressed (S94), updated (S96), optionally compressed again (S98), and stored (S100). Note that an update could be implemented by creating a new bitmap from the user identifier in the list, optionally compressed and overwrites the existing bitmap. Alternatively, a specific container in the compressed bitmap which contains the user ID(s) in the list could be decompressed and updated with the new user states from the disk.

FIG. 5 shows the segments which have been recalled for a particular user identifier, which has been entered in the search block 50 in the upper right-hand corner. The numerical identifier in this case is 132561467. The segments are:
   1662_abgroup1_1_fix.csv
   923 country-ip eg
   621 country-sim eg
   923 country-ip eg the user is in segment 'country-ip eg' (the user is Egyptian according to his IP address). 621 country-sim. eg means the user is in segment 'country-sim eg' (the user is Egyptian according to his SIM card), and 1662_abgroup 1_1_fix.csv means he is in a ab test group 1 (in a test group where a new feature is being tested)

Figure 6:
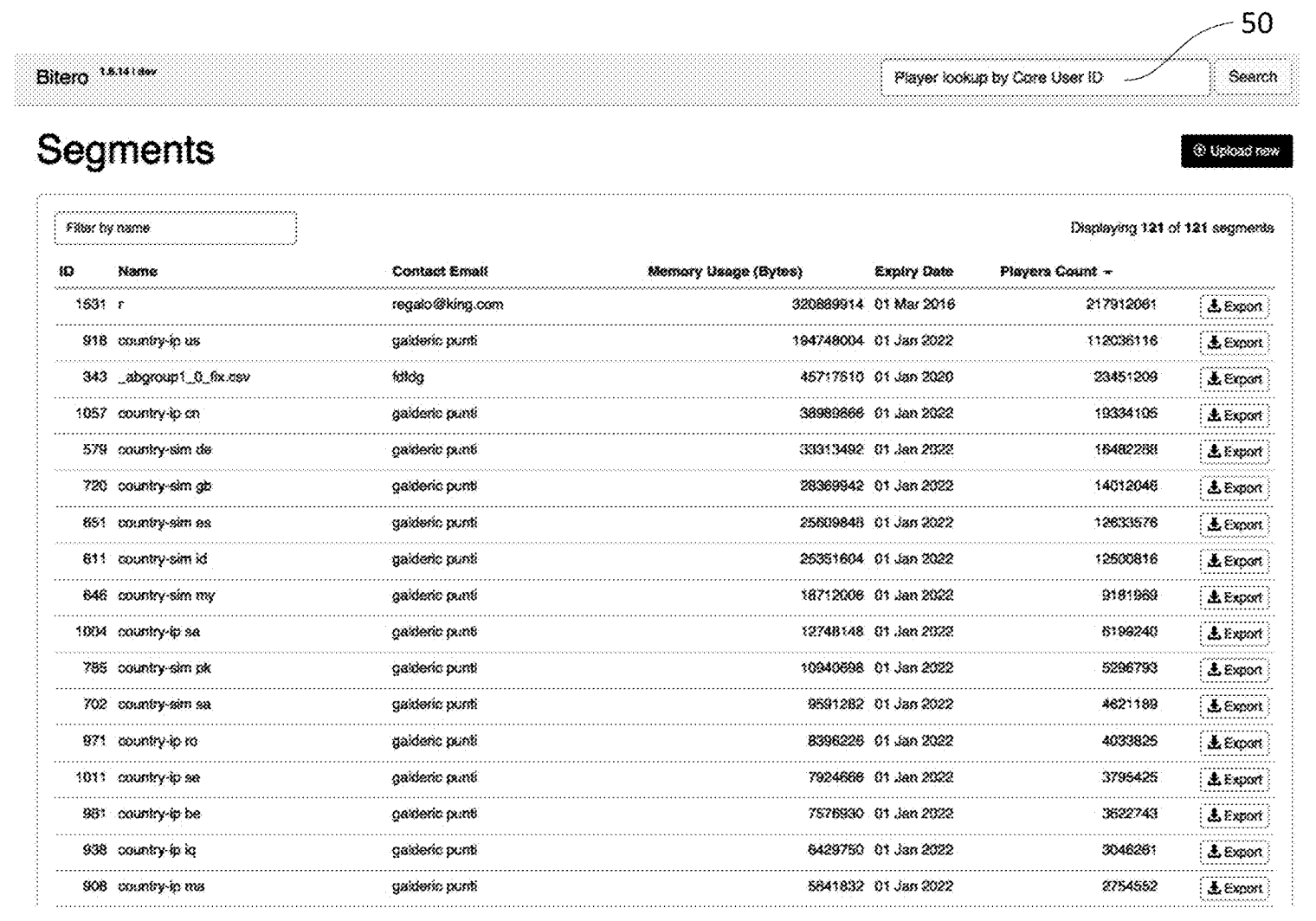

Each segment indicates the memory usage 52 in terms of bytes, an expiry date and also the number of other players 54 in that segment. FIG. 6 is an extract of a screen indicating all available segments, which can be filtered by name.

Figure 7:
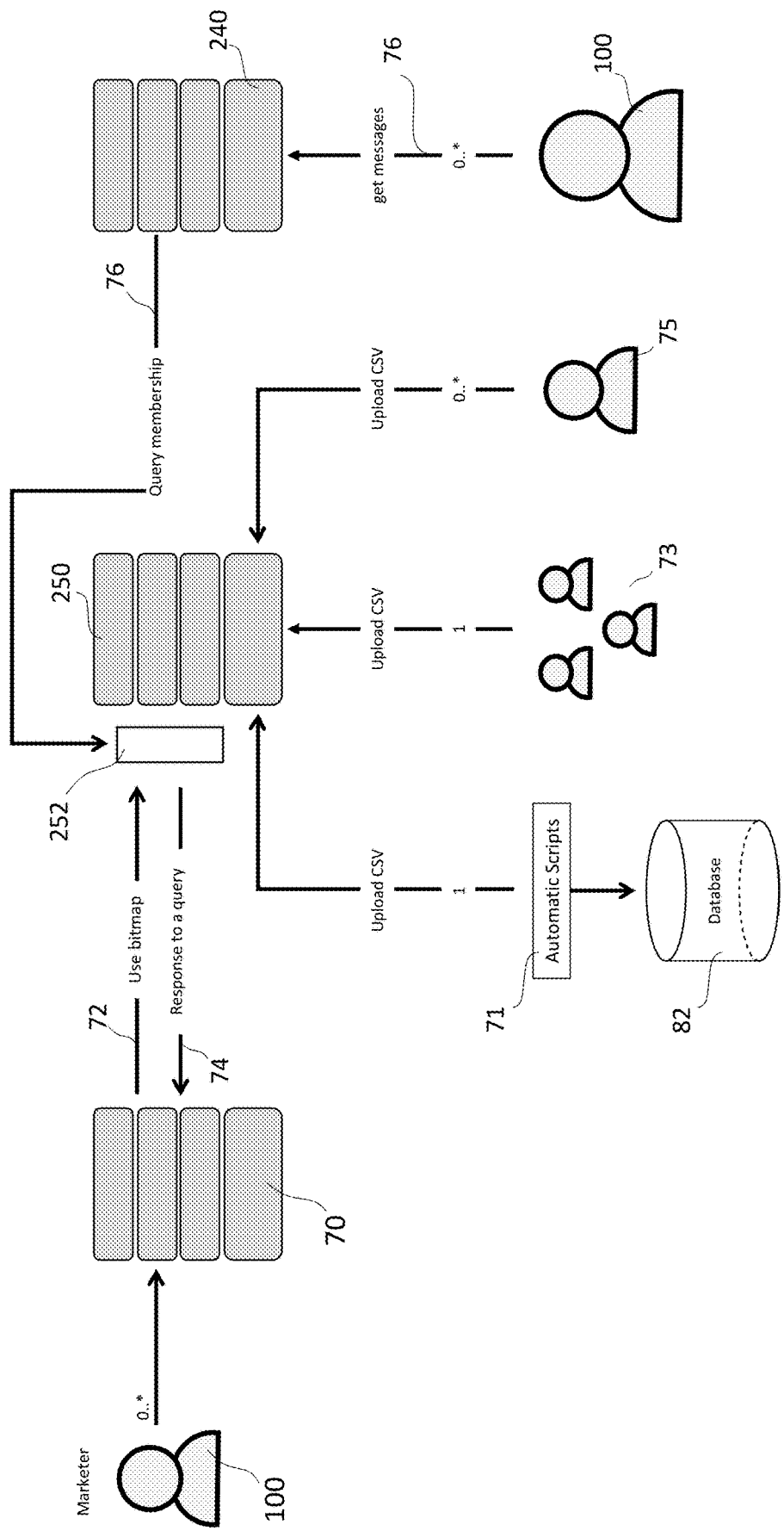
FIG. 7 is a schematic block diagram illustrating a use case for bitmap segmented data.

FIG. 7 illustrates an example of a use case for the technique of storing segmented data described herein. In FIG. 7, the memory 250 holds segment data in the form of bitmaps as described. A marketer may have a marketing service for which he is interested to be able to do such things as
(a) Know the list of users in a given segment
(b) Know the segments in which a player is in (Query: is this player in a segment?)
(c) Upload a list of user ids to a new segment
(d) Automatically query the engine, periodically, for the status of a user ID (for example, is 'User 1 in Sweden?')

He is associated with a marketing processor 70. Items (a) and (b) are accomplished by a 'use bit map' query from the processor 70. The query can identify segments in which the marketer is interested or users (players) in which he is interested—for example using the web UI in FIG. 4. This query is labelled "use bitmap", and identifies itself as an (a) or (b) type query. In one example of item (a), the marketing processor 70 may ask engine 252 for all of the players who have played a particular game in the past week, as indicated by 72, to which engine 252 responds by sending a list of user Ids of players who have played that game in the last week, as indicated by 74. In one example of item (b), the marketing processor 70 may enquire the Bitero engine 252 if User ID1 is in the Swedish segment, 72, to which the engine may return a Yes or No response to processor 70, 74.

Item (d) can be accomplished by a 'get a bitmap' query from the processor 70. In one such example, marketing processor 70 may ask engine 252 for a bitmap of Swedish users who have played in the last week, 72, to which the engine responds by sending back to the processor the appropriate bitmap. Such automated queries may be generated several times a minute, from multiple processors. Either the bit map could be returned for analysis by the querying processor, or the processed response (as in (a) or (b)).

Another use case is shown on the right-hand side of FIG. 7. Reference numeral 100 denotes an active user associated with one of the user devices of FIG. 1. When they log on, a query 76 is sent from their associated computer device to the backend infrastructure 240 to retrieve offerings associated with his play. A query 76 is sent to the core memory 250 to retrieve segment data associated with that user (see, for example, FIG. 6). Based on this segment data, appropriate offerings can be selected and returned to the user. In FIG. 7, therefore the bitmaps are used to support external services who can make requests.

Different sources of information into the core memory 250 are also illustrated in FIG. 7, each source uploading a CSV file identifying segments with their associated user ids. The sources could be:

Automatic scripts (71) making queries to proprietary databases, which may be of different protocols, e.g. mysql, exasol, hive. One database 82 is shown in FIG. 7. Product personnel 73 selecting a set of users to whom they want to apply some logic. This set of users may be shared with other users of the backend infrastructure, and providing a bit map with a segment ID is an efficient way to achieve that.

A person 75 uploading a CSV file for any kind of purpose (not necessary a marketer), e.g. a list of whitelisted user ids for testing.

Figure 8:
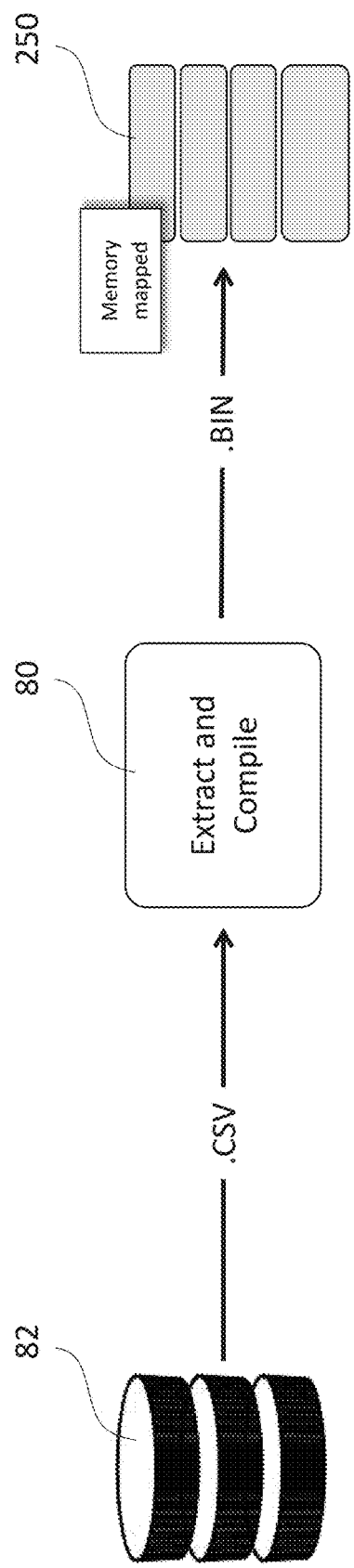
FIG. 8 is a schematic diagram illustrating another use case for segmented bitmap data.

In an alternative use case, shown in FIG. 8, an API 90 in the bit map engine 252 can use a .csv file uploaded from one or more database 82 by extracting data and automatically compiling bit maps according to pre-programmed requirements. The resulting bitmaps are stored in a compressed form in the memory 250. The API 80 operates as a piece of code which is pre-programmed to automatically extract user data for certain segments from the database 82.

Compression techniques for compressing bitmaps are known. For the sake of completeness, one known compression technique is described here. According to this technique, 64,000 different containers are provided, each of which will store a chunk of a large bitmap. The containers can be operated on independently to extract data from specific chunks without the need to decompress the whole bitmap. A container may hold a compressed portion of the bitmap, or it may hold the bitmap as a simple list (if the size of that section of the bitmap is sufficiently small). In one example, containers can be accessed by dividing the numerical identifier by modulo division (multiples of container size). The number of whole times the identifier is divided, up to a remainder indicates the relevant container. In the particular container, the relevant bit position can be identified by the remainder. In another example, the 16 most significant bits may be used to determine the container to query. The 16 less significant bits may be used to determine the user id to check in that container. Containers are checked depending on their nature (bitmaps by checking a particular bit, and lists by making a binary search). So, while still allowing the bitmap to be compressed, nevertheless, there are very good access speeds as the whole file does not need to be decompressed when accessed.

The access time for a bitmap may be extremely fast, as it only requires a division by 8 and checking one of the resulting bits. For example, a 600 million user segment can be checked for user membership in 500 nanoseconds. By using compressed bitmaps, 3.8 billion user assignment to groups can be stored by only requiring around 1.8 bytes per assignment. Different compression techniques provide different numbers of bytes per assignment.

The invention claimed is:

1. A computer implemented method of creating and storing segmented data, the method performed by a computer configured to receive lists of entity identifiers representing entities and to create bitmaps from the lists, the bitmaps indicating which of a plurality of entities belong to which of a plurality of segments, each segment accommodating entities sharing a single binary characteristic, the method comprising:

receiving by the computer at least first and second lists for respective first and second segments, each of the first and second lists identifying entity identifiers representing entities which belong to the respective first or second segment, the entity identifiers selected from a sequence of entity identifiers;

causing the computer to create respective first and second bitmaps from the at least first and second lists in which each bit has a bit position in a bit sequence corresponding to the sequence of entity identifiers, the computer configured to define for each respective first and second bitmap the state of each bit to indicate whether the entity identifier representing that position in the sequence of entity identifiers identifies an entity belonging in the segment or not, wherein the same position in the bit sequence of the first and second bitmaps represents the same entity identifier, and causing the computer to associate the first and second bitmaps with respective first and second segment identifiers and store the first and second bitmaps with their associated identifiers in a computer memory, as the segmented data, wherein the first segment accommodates entities sharing a first binary characteristic and the second segment accommodates entities sharing a second binary characteristic different from the first binary characteristic.

2. A method according to claim 1, wherein the sequence of entity identifiers is a numerical sequence.

3. A method according to claim 1, wherein the sequence is divided into ranges, and the entity identifiers are divided into groups, wherein each group of entity identifiers belongs in a range of the sequence, and wherein multiple bit maps, each associated with a respective range, are stored with the segment identifier.

4. A method according to claim 1, wherein the entities are users of computer devices connectable in a communication network.

5. A method according to any of claim 1, wherein the entities are computer devices connectable in a communication network.

6. A method according to claim 4, wherein the computer devices are connectable to a server in the communication network for downloading a digital product from the server.

7. A method according to claim 1, wherein the at least one of the first and second binary characteristic of a segment is one of:
whether an entity has connected from a particular territory;
whether an entity has connected within a predetermined time period;
whether an entity is testing a new feature;
whether the entity is of a specific gender;
whether the entity requires a digital product in a specific language.

8. A method according to claim 1, wherein the first and second bitmaps associated with the first and second segment identifiers are stored in the computer memory in compressed form.

9. A method according to claim 1, wherein the first and second lists of entity identifiers are received at the computer with respective segment names indicating the binary characteristic of the respective first and second segment.

10. A method according to claim 9, comprising storing in the computer memory a mapping of segment names and segment identifiers.

11. A method according to claim 1, comprising the step of, after receiving the first and second lists of entity identifiers, determining if information to identify an existing segment is provided, and if so, updating an existing bitmap for the segment in order to create the bitmap using the list for that segment.

12. A method according to claim 10, wherein if information to identify one of the segments is not received, a segment name is created from metadata received with the respective list and associated with a segment identifier in the mapping.

13. A method according to claim 1, wherein when a bit is set to a positive state at a position in the bitmap it indicates that the entity associated with the corresponding position in the sequence belongs in the segment.

14. The method according to claim 1 comprising creating a third bitmap by combining the first and second bitmaps using a Boolean algebraic operation to generate a third segment.

15. A computer device comprising:
a computer memory; and
a computer, the computer being programmed by computer executable instructions to execute a method of storing segmented data in the computer memory, the segmented data indicating which of a plurality of entities belong to which of a plurality of segments, each segment accommodating entities sharing a single binary characteristic, the method comprising:
receiving at the computer at least first and second lists for respective first and second segments, each of the first and second lists identifying entity identifiers representing entities which belong to the respective first or second segment, the entity identifiers selected from a sequence of entity identifiers;
the computer using the at least first and second lists to create respective first and second bitmaps in which each bit has a bit position in a bit sequence corresponding to the sequence of entity identifiers, wherein the state of each bit indicates whether the entity identifier representing that position in the sequence identifies an entity belonging in the segment or not;
wherein the same position in the bit sequence of the first and second bitmaps represents the same entity identifier, and
storing the first and second bitmaps in a memory in association with respective first and second segment identifiers, as the segmented data, wherein the first segment accommodates entities sharing a first binary characteristic and the second segment accommodates entities sharing a second binary characteristic different from the first binary characteristic.

16. A computer device according to claim 15, wherein the computer is further programmed to implement a method of responding to a request transmitted from a requesting computer device to the computer device, the method comprising:
receiving the request, the request comprising at least one of a user identifier and a segment identifier identifying one or more segments;
accessing one or more bitmaps associated with the one or more segments,
using the bitmap to determine the results of a first type of query (a) whether a user identified by the user identifier is in the one or more segments and/or the result of a second type of query (b) which users are in the one or more segments; and
responding to the request with a response to the first and/or second type of query.

17. A computer system comprising:
a computer memory;
a computer, the computer being programmed by computer executable instructions to execute a method of storing segmented data in the computer memory, the segmented data indicating which of a plurality of entities belong to which of a plurality of segments, each segment accommodating entities sharing a single binary characteristic, the method comprising:
receiving at the computer at least first and second lists for respective first and second segments, each of the first and second lists identifying entity identifiers representing entities which belong to the respective first or second segment, the entity identifiers selected from a sequence of entity identifiers;
the computer using the at least first and second lists to create respective first and second bitmaps in which each bit has a bit position in a bit sequence corresponding to the sequence of entity identifiers, wherein the state of each bit indicates whether the entity identifier representing that position in the sequence identifies an entity belonging in the segment or not;
wherein the same position in the bit sequence of the first and second bitmaps represents the same entity identifier;

storing the first and second bitmaps in a memory in association with respective first and second segment identifiers, as the segmented data, wherein the first segment accommodates entities sharing a first binary characteristic and the second segment accommodates entities sharing a second binary characteristic different from the first binary characteristic;

at least one source for providing lists of entity identifiers of entities belonging to a segment; and at least one requesting computer device for issuing requests to the computer device.

18. A computer system according to claim 17, wherein the at least one source comprises a computer device with a display operable to display a web-based user interface with which a user can interact to generate the list of entity identifiers.

19. A computer system according to claim 17, wherein the at least one source comprises a database storing data relating to the entities, and a processor programmed to execute an automatic script for extracting data from the database and generating the list of entity identifiers.

20. A computer system according to any claim 17, wherein the requesting device comprises a computer device having a display operable to display a web-based user interface with which a user can engage to generate requests and receive responses.

21. A computer system according to claim 17, wherein the requesting device comprises a processor programmed to automatically generate requests and receive responses.

22. A computer implemented method of responding to a request transmitted from a requesting computer device to a responding computer device, the method comprising:

receiving the request, the request comprising at least one of a user identifier and a segment identifier identifying one or more segments each segment accommodating users sharing a single binary characteristic;

accessing one or more bitmaps associated with the one or more segments, wherein in each bitmap a user belonging to a segment has a bit set in the bitmap of the segment;

using the bitmap to determine the results of a first type of query (a) whether a user identified by the user identifier is in the one or more segments and/or the result of a second type of query (b) which users are in the one or more segments; and responding to the request with a response to the first and/or second type of query.

23. A method according to claim 22, wherein each segment is associated with a segment name identifying the binary characteristic of the segment.

24. A method according to claim 23, wherein the segment name is included in the request transmitted from the requesting computer device.

25. A method according to claim 22, wherein the requesting computer device is a server operable to provide digital products to the entities, wherein the server uses the response to determine which entities are to receive a particular digital product.

26. A method according to claim 25, wherein the digital product is computer code.

27. A method according to claim 25, wherein the digital product is a digital item.

28. A method according to claim 22 wherein in the or each bitmap each of the bits has a bit position in a bit sequence corresponding to a sequence of user identifiers, the state of each bit indicating whether the user identifier representing that position in the sequence identifies a user belonging in the segment or not.

29. The method according to claim 22 comprising accessing more than one bitmap and combining bitmaps using a Boolean algebraic operation to identify users in more than one segment.

* * * * *